(12) United States Patent
Nakamura et al.

(10) Patent No.: US 9,347,550 B2
(45) Date of Patent: May 24, 2016

(54) SHIFT LEVER DEVICE USING MAGNETISM DETECTION SWITCH

(71) Applicants: ALPS ELECTRIC CO., LTD., Tokyo (JP); Chiyoda Kogyo Co., Ltd., Gunma (JP)

(72) Inventors: Tokuo Nakamura, Niigata-ken (JP); Yasushi Watanabe, Niigata-ken (JP); Naoki Takita, Gunma-ken (JP)

(73) Assignees: ALPS ELECTRIC CO., LTD., Tokyo (JP); CHIYODA KOGYO CO., LTD., Gunma (JP)

( * ) Notice: Subject to any disclaimer, the term of this patent is extended or adjusted under 35 U.S.C. 154(b) by 227 days.

(21) Appl. No.: 14/091,235

(22) Filed: Nov. 26, 2013

(65) Prior Publication Data

US 2014/0145712 A1 May 29, 2014

(30) Foreign Application Priority Data

Nov. 29, 2012 (JP) ................................. 2012-260617

(51) Int. Cl.
*G01R 33/00* (2006.01)
*F16H 59/10* (2006.01)

(52) U.S. Cl.
CPC ................... *F16H 59/105* (2013.01)

(58) Field of Classification Search
CPC .......................... F16H 59/105; G01R 33/0088
See application file for complete search history.

(56) References Cited

U.S. PATENT DOCUMENTS

| 2004/0070390 | A1* | 4/2004 | Lamb et al. ............... 324/207.21 |
| 2004/0095129 | A1* | 5/2004 | Furlong ...................... 324/207.2 |
| 2010/0308802 | A1* | 12/2010 | Guibet ....................... 324/207.11 |
| 2013/0063133 | A1* | 3/2013 | Iwata .......................... 324/207.2 |

FOREIGN PATENT DOCUMENTS

| JP | 2007-220367 | 8/2007 |
| JP | 2007-273528 | 10/2007 |
| JP | 2007-333490 | 12/2007 |
| JP | 2008-32155 | 2/2008 |
| JP | 2009-9805 | 1/2009 |
| JP | 2009-258042 | 11/2009 |

* cited by examiner

*Primary Examiner* — Terence Boes
(74) *Attorney, Agent, or Firm* — Beyer Law Group LLP

(57) ABSTRACT

A magnetic field generating portion is provided to a moving unit moving together with an operating unit. Two magnets are disposed in the magnetic field generating portion with a gap between in the direction of movement. A detection unit is provided to a fixed portion. The detection unit includes a first magnetoresistive device and a second magnetoresistive device and outputs of different combinations are obtained depending which of a first detection position, a second detection position, and an intermediate detection position, the moving unit has moved to.

6 Claims, 13 Drawing Sheets

FIG. 9A
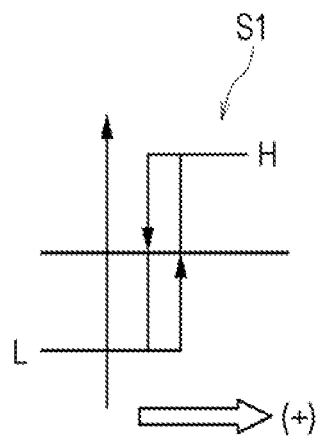
FIG. 9B
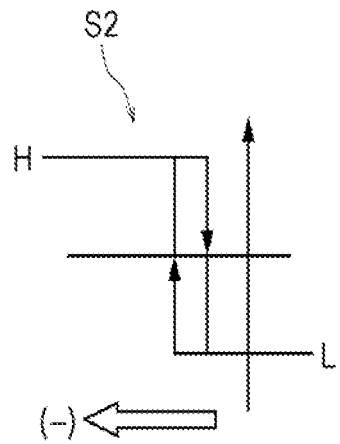
FIG. 10
| POSITION | (l) | (n) | (r) |
|---|---|---|---|
| OUTPUT S1 | H | L | L |
| OUTPUT S2 | L | L | H |

FIG. 14

| POSITION | (1) | (2) | (3) | (4) |
|---|---|---|---|---|
| OUTPUT S1 | L | H | L | H |
| OUTPUT S2 | L | L | H | L |
| OUTPUT S3 | OFF | ON | ON | OFF |

SHIFT LEVER DEVICE USING MAGNETISM DETECTION SWITCH

CLAIM OF PRIORITY

This application claims benefit of Japanese Patent Application No. 2012-260617 filed on Nov. 29, 2012, which is hereby incorporated by reference.

BACKGROUND OF THE INVENTION

1. Field of the Invention

The present invention relates to a shift lever device using a magnetism detection switch which uses a magnetoresistive device to enable detection of three detection positions.

2. Description of the Related Art

Japanese Unexamined Patent Application Publication No. 2007-273528 and Japanese Unexamined Patent Application Publication No. 2007-220367 disclose a magnetism detection switch using a magnetoresistive device.

The switch described in Japanese Unexamined Patent Application Publication No. 2007-273528 includes a magnetism sensor using a magnetoresistive device and two magnets, which move relative to each other. The two magnets are arrayed with different magnetic poles facing the magnetism sensor. The magnetism sensor moves between a first position facing one of the magnets, and a second position facing the other of the magnets.

The magnetoresistive device has a pinned magnetic layer pinned in a direction orthogonal to the direction in which the two magnets are arrayed. The direction of magnetism of a free magnetic layer changes between the first position and second position, and as a result, the detection output of the magnetism sensor is switched between on and off.

The switch described in Japanese Unexamined Patent Application Publication No. 2007-220367 has two gaps between yokes, and the orientation of the magnetic fields within each of the gaps is 180 degrees opposite. A magnetoresistive device is mounted on a tip portion of a sliding mechanism. This magnetoresistive device passes through the two gaps, with different switching output being obtained depending on whether situated within one gap or in the other.

The magnetism detection switches described in Japanese Unexamined Patent Application Publication No. 2007-273528 and Japanese Unexamined Patent Application Publication No. 2007-220367 use magnetoresistive devices, so switching output can be obtained without contact. However, both switches are only capable of detecting two positions, and cannot obtain detection output distinguishing three detection positions.

Next, Japanese Unexamined Patent Application Publication No. 2008-32155 and Japanese Unexamined Patent Application Publication No. 2007-333490 disclose a shift lever device of an automobile transmission using a non-contact detecting mechanism.

The shift lever device described in Japanese Unexamined Patent Application Publication No. 2008-32155 includes a position sensor with Hall elements configured at each of multiple switching positions. Tilting a shift lever moves a magnet. The magnet moves through the detection areas of each of the multiple position sensors, and thus multi-stage switching detection output is obtained.

The shift lever device described in Japanese Unexamined Patent Application Publication No. 2007-333490 includes multiple bias magnets and a magnetoresistive device fixed at a fixed portion, and a counter magnet is moved by a shift lever. The magnetic field is drawn into the counter magnet from the bias magnets, so the orientation of the magnetic field applied to the magnetoresistive device changes in accordance with the position to which the counter magnet has moved. Detecting the orientation of the magnetic field by the magnetoresistive device enables detection of which switching position the counter magnet has moved to.

The shift lever device described in Japanese Unexamined Patent Application Publication No. 2008-32155 necessitates a great number of position sensors to be provided, so the structure is complicated. Also, the shift lever device described in Japanese Unexamined Patent Application Publication No. 2007-333490 detects the orientation of the magnetic field applied to the magnetoresistive device, so there is the possibility of erroneous detection, and highly-reliable output is not easily obtained.

SUMMARY OF THE INVENTION

The present invention provides a shift lever device capable of obtaining highly-reliable detection output of shift switching, using a minimal number of magnets and magnetoresistive devices.

A shift lever device includes: a shift lever having at least three switching positions and being configured to move by being tilted; a moving portion configured to reciprocally move in accordance with tilting of the shift lever; a fixed portion configured facing the moving portion; a magnetic field generating unit, provided to one of the fixed portion and the moving portion; and a magnetism detection unit, provided to the other of the fixed portion and the moving portion. The moving portion can be moved to an intermediate detection position, a first detection position by moving in a first direction from the intermediate detection position, and a second detection position by moving in a second direction, which is opposite to the first direction, from the intermediate detection position. The magnetism detection unit includes a first detection unit including a first magnetoresistive device, and obtaining detection output when intensity of a magnetic field in the first direction exceeds a predetermined value, and a second detection unit including a second magnetoresistive device, and obtaining detection output when intensity of a magnetic field in the second direction exceeds a predetermined value. The magnetic field generating unit includes a magnet configured to provide the second detection unit with a magnetic field of intensity exceeding the predetermined value in the second direction, when the moving portion moves to the first detection position, provide the first detection unit with a magnetic field of intensity exceeding the predetermined value in the first direction, when the moving portion moves to the second detection position, and provide neither the first detection unit nor the second detection unit with a magnetic field of intensity exceeding the predetermined value in the first direction or the second direction, when the moving portion moves to the intermediate detection position.

According to the above configuration, detection output corresponding to an intermediate detection position, a first detection position, and a second detection position can be obtained with high reliability.

A pair of magnets, arrayed in the direction of movement of the moving portion, may be provided to the magnetic field generating unit, with both of the magnets having the same magnetic pole in the direction facing the magnetism detecting unit.

Disposing a pair of magnets arrayed in the direction of movement enables the region where both the first detection unit and second detection unit are in a non-detection state to be broader when the moving portion moves to the intermediate position, thereby enabling three detection positions to be detected by accurately distinguishing therebetween.

A magnet, having a width dimension in the direction of movement of the moving portion greater than a thickness dimension in a direction orthogonal to the direction of movement, may be provided to the magnetic field generating unit, with the face of the magnet facing the magnetism detecting unit being magnetized to a single magnetic pole.

This configuration also enables three detection positions to be detected by accurately distinguishing therebetween.

The direction of magnetization of the free magnetic layer of the first magnetoresistive device may be directed toward the first direction when the intensity of a magnetic field in the first direction exceeds the predetermined value, and the direction of magnetization of the free magnetic layer of the second magnetoresistive device directed toward the second direction when the intensity of a magnetic field in the second direction exceeds the predetermined value.

The shift lever device may further include: a shift lever configured to move by being tilted in directions which are mutually orthogonal; a first moving portion configured to reciprocally move in accordance with tilting of the shift lever in one direction; a second moving portion configured to reciprocally move in accordance with tilting of the shift lever in another direction; and a fixed portion configured facing the first moving portion and the second moving portion. The magnetic field generating unit and magnetism detection unit may be provided between at least one of the first moving portion and the second moving portion, and the fixed portion.

The magnetic field generating unit and magnetism detection unit may be provided between the first moving portion and the fixed portion, and a switch configured to detect two positions provided between the second moving portion and the fixed portion.

According to the above configurations, highly accurate detection of three positions can be enabled with a minimum number of devices and a minimum number of magnetic field generating units.

BRIEF DESCRIPTION OF THE DRAWINGS

FIGS. 9A and 9B are waveform output diagrams of waveforms output from each switch circuit illustrated in FIGS. 8A and 8B;

FIG. 10 is an explanatory diagram illustrating combinations of three detection positions and outputs from the switch circuits;

FIG. 14 is an explanatory diagram illustrating combinations of switching positions of the shift lever and outputs from the magnetism detection switches;

DESCRIPTION OF THE PREFERRED EMBODIMENTS

Figure 1:
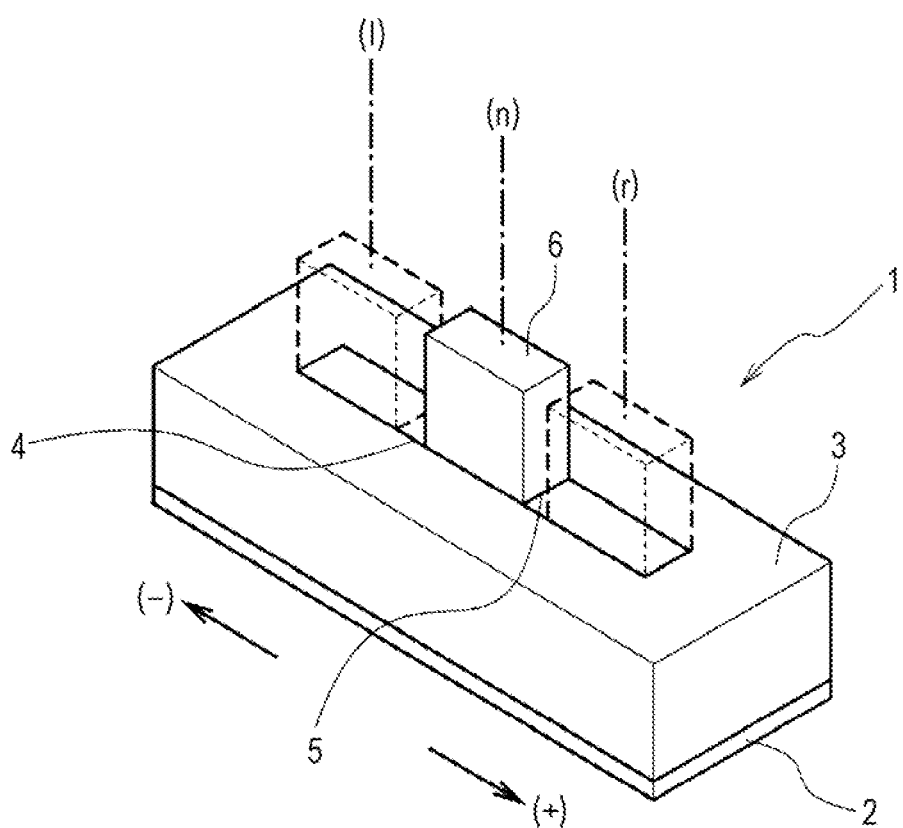
FIG. 1 is an external perspective view of a magnetism detection switch according to an embodiment of the present invention.

A magnetism detection switch 1 illustrated in FIG. 1 includes a base plate 2 which is a fixed portion, and a case 3 covering the base plate 2. A moving unit 5 which moves in a (+) direction and a (−) direction as to the base plate 2 is provided within the case 3. An operating unit 6 is provided integrally with the moving unit 5. The operating unit 6 protrudes upwards from a slender slit 4 formed at the upper face of the case 3. The moving unit 5 can slide in the (+) and (−) directions within the range of movement of the operating unit 6 within the slit 4.

The (+) direction is a first direction and the (−) direction is a second direction in the magnetism detection switch 1. The magnetism detection switch 1 obtains detection output of different combinations when the moving unit 5 and operating unit 6 move to each of three detection positions.

A position where the operating unit 6 has reached the end in the first direction (+) is a first detection position (r), a position where the operating unit 6 has reached the end in the second direction (−) is a second detection position (l), and an intermediate position between the first direction (+) and the second direction (−) is an intermediate detection position (n), as illustrated in FIG. 1. A light locking mechanism is provided within the case 3, so that the operating unit 6 is lightly locked at each of the first detection position (r), second detection position (l), and intermediate detection position (n). Also, an arrangement may be made where the operating unit 6 is stable at the intermediate detection position (n) due to spring force, and if the operating unit 6 is moved to the first detection position (r) by a finger and the finger is released, the operating unit 6 returns to the intermediate detection position (n), or if the operating unit 6 is moved to the second detection position (l) by a finger and the finger is released, the operating unit 6 returns to the intermediate detection position (n).

Figure 2:
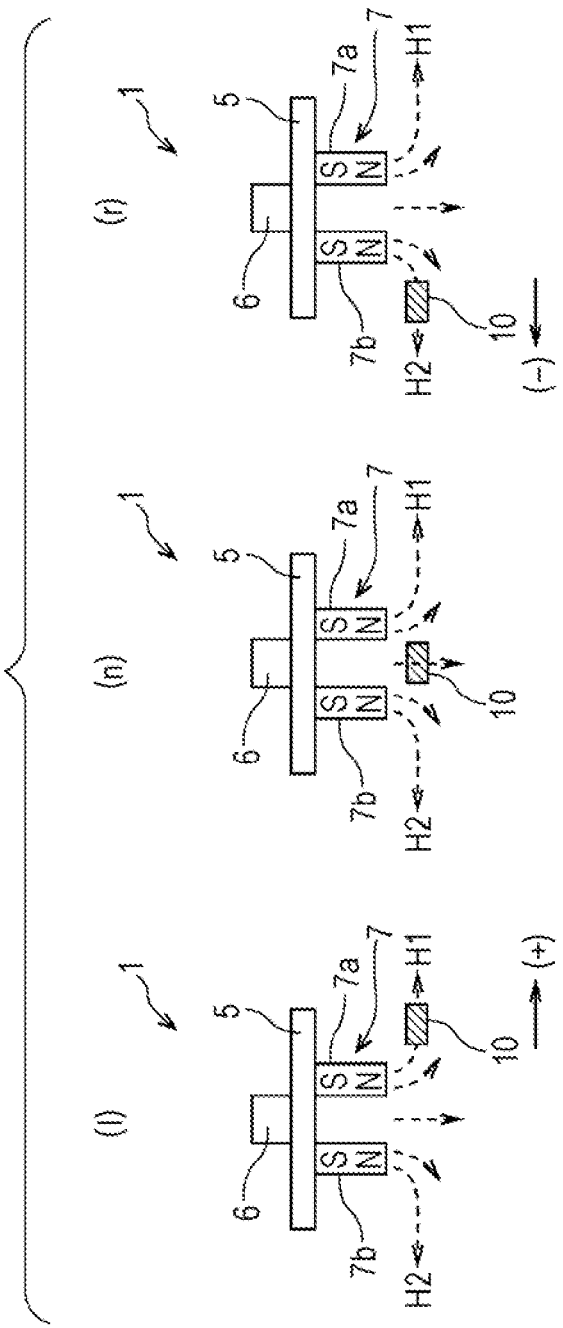
FIG. 2 is an explanatory diagram indicating the structure of magnets and a detecting unit according to a first embodiment, at each detection position.

A minute detection unit 10 which is a magnetism detection unit is fixed to the base plate 2, and a magnetic field generating portion 7 is fixed to the lower face of the moving unit 5, as illustrated in FIG. 2. The magnetic field generating portion 7 preferably has two magnets 7a and 7b. The magnets 7a and 7b are preferably disposed with a space therebetween in the direction of movement of the moving unit 5. Each of the magnets 7a and 7b preferably has the same magnetic polarity directed toward the base plate 2. The magnetic field generating portion 7 according to the first embodiment as illustrated in FIG. 2 are preferably arranged such that the N-poles of the magnets 7a and 7b face downwards.

In the magnetic field generating portion 7, the intensity of a magnetic field component H1 toward the first direction (+) is great further to the right from the magnet 7a, and the intensity of a magnetic field component H2 toward the second direction (−) is great further to the left from the magnet 7b. The magnet 7a and magnet 7b are preferably disposed with space therebetween and the same N-pole facing downwards, so the downward magnetic component is strong at the intermediate portion between the two magnets 7a and 7b, but the intensity of the magnetic field component H1 toward the first direction (+) and the intensity of the magnetic field component H2 toward the second direction (−) are very weak.

Upon the moving unit 5 and operating unit 6 reaching the first detection position (r) in FIG. 2, the magnetic field component H2 facing the second direction (−) acts strongly on the detection unit 10, and upon reaching the second detection position (l), the magnetic field component H1 facing the first direction (+) acts strongly on the detection unit 10. Upon the moving unit 5 and operating unit 6 reaching the intermediate detection position (n), the magnetic field component H1 facing the first direction (+) and the magnetic field component H2 facing the second direction (−) hardly act at all on the detection unit 10.

Figure 3:
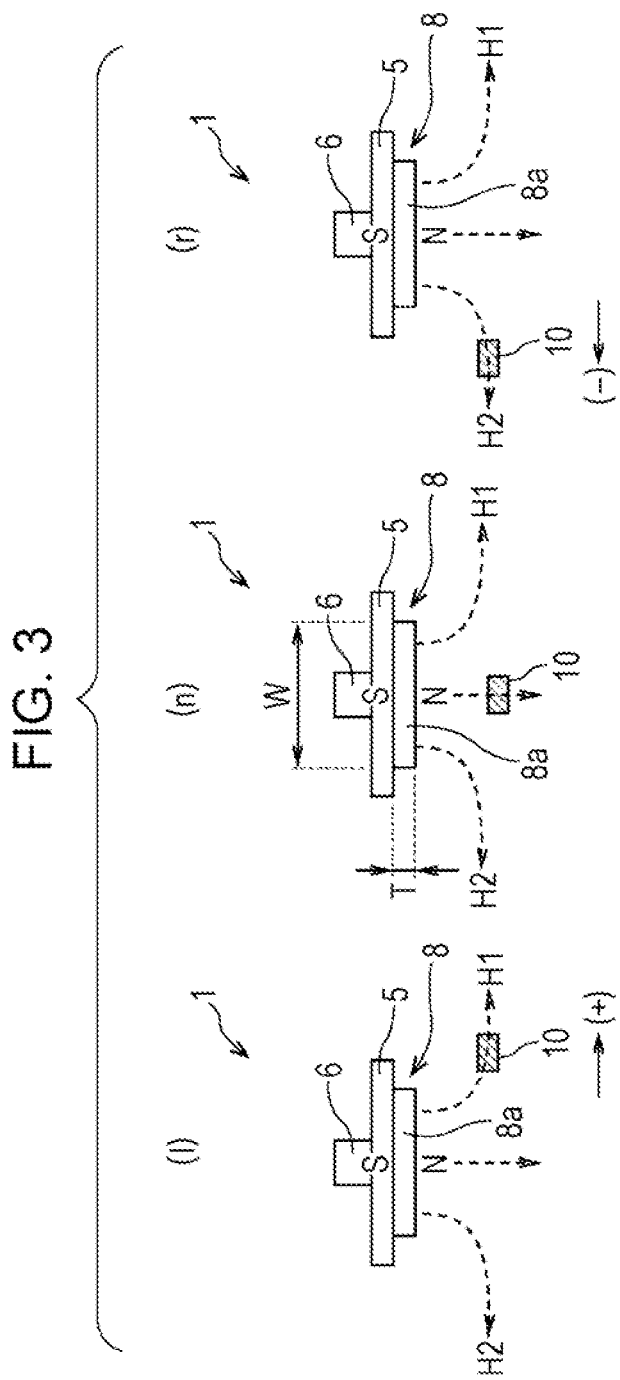
FIG. 3 is an explanatory diagram indicating the structure of magnets and a detecting unit according to a second embodiment, at each detection position.

A magnetic field generating unit 8 according to a second embodiment is illustrated in FIG. 3. The magnetic field generating unit 8 preferably has one magnet 8a fixed to the lower face of the moving unit 5. The width dimension W of the magnet 8a in the (+) and (−) directions, which is the direction of movement of the moving unit 5, is preferably sufficiently greater than the thickness dimension T in the direction orthogonal to this direction. Also, the entire downward face of the magnet 8a is preferably magnetized to the same magnetic polarity (N-pole).

In the embodiment illustrated in FIG. 3 as well, upon the moving unit 5 and operating unit 6 reaching the first detection position (r), the magnetic field component H2 facing the second direction (−) acts strongly on the detection unit 10, and upon reaching the second detection position (l), the magnetic field component H1 facing the first direction (+) acts strongly on the detection unit 10. Also, the N-pole magnetized face of the magnet 8a facing downwards preferably is wide, so the intensity of the magnetic field in the downward direction is strong at the middle portion of the magnet 8a. Accordingly, upon the moving unit 5 and operating unit 6 reaching the intermediate detection position (n), the magnetic field component H1 facing the first direction (+) and the magnetic field component H2 facing the second direction (−) hardly act at all on the detection unit 10.

The magnetic field generating portion 7 illustrated in FIG. 2 and the magnetic field generating unit 8 illustrated in FIG. 3 are arranged so that the region where the intensity of downward facing magnetic field is strong, is set to a wide range in the (+) and (−) direction of movement of the moving unit 5. Accordingly, the region where the magnetic field component H1 facing the first direction (+) and the magnetic field component H2 facing the second direction (−) hardly act on the detection unit 10 at the intermediate detection position (n) can be set to a wide range in the (+) and (−) direction.

Accordingly, the state where the detection unit 10 is situated at the intermediate detection position (n) can be detected with a high level of reliability by the detection unit 10.

Figure 4:
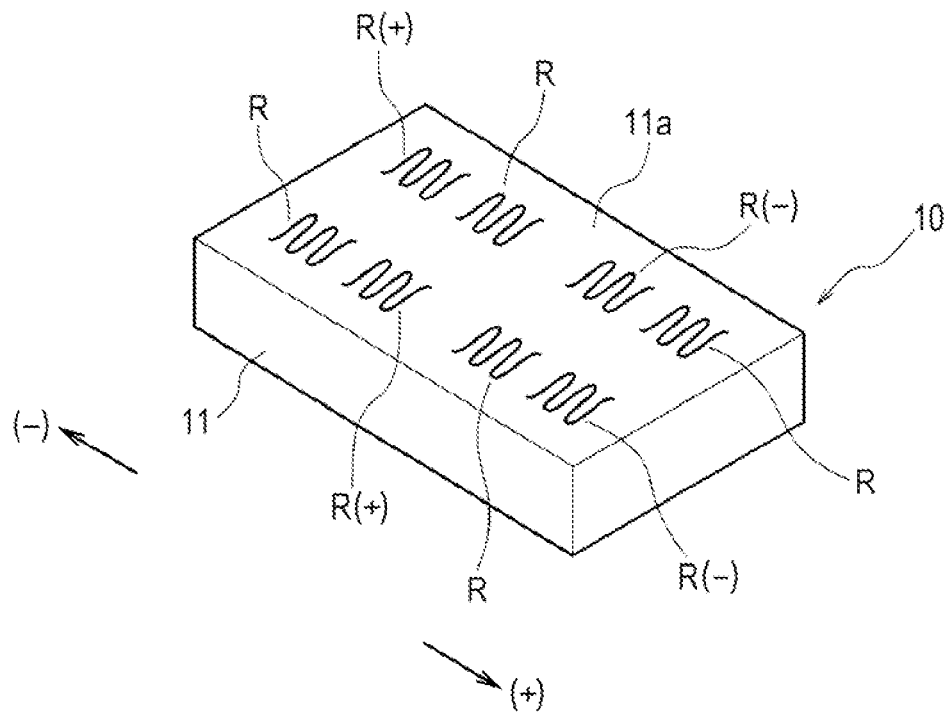
FIG. 4 is a perspective view of a detection unit which is a magnetism detection unit.

The detection unit 10 which is a magnetism detection unit includes, as illustrated in FIG. 4, a pair of first magnetoresistive devices R(+), a pair of second magnetoresistive devices R(−), and four fixed resistor devices R, formed upon an upper face 11a of an IC package 11 by thin-film formation process.

Figure 5:
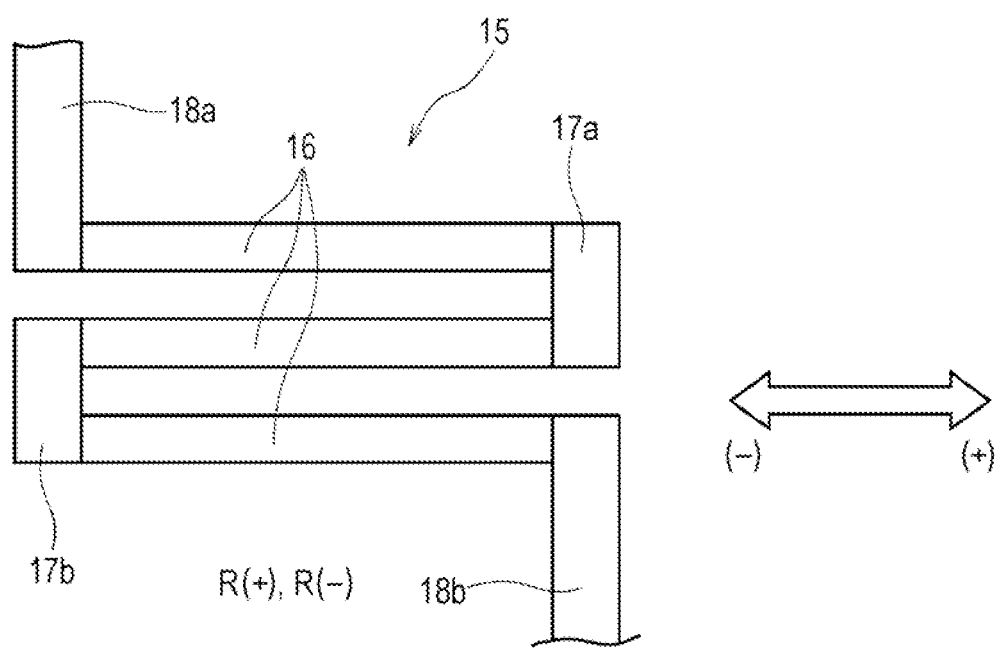
FIG. 5 is an enlarged perspective view of a magnetoresistive device.

The device structure 15 of the first magnetoresistive device R(+) and second magnetoresistive device R(−) is illustrated in FIG. 5. The device structure 15 of a magnetoresistive device includes multiple device portions 16 formed in parallel, with two each of the multiple device portions 16 being connected at the left and right ends by connecting electrodes 17a and 17b. Further, extraction electrodes 18a and 18b are connected to the device portions 16 situated at the top and bottom ends in the drawing. Thus, the device portions 16 are connected serially, and a meandering pattern is configured.

The device structure 15 is configured such that the longitudinal direction of the device portions 16 is in the first and second directions, i.e., in the (+) and (−) directions. The upper faces of the device portions 16 illustrated at the close side to the viewer in FIG. 5 face upwards in FIGS. 2 and 3, so as to face the magnetic pole (N-pole) of the magnets 7a and 7b or the magnetic pole (N-pole) of the magnet 8a.

FIGS. 6A through 7D illustrate the cross-sectional structure of the device portions 16, for different embodiments. A device portion 16 is a giant magnetoresistive device (GMR device), including a pinned magnetic layer 16a, a free magnetic layer 16b, and a non-magnetic electroconductive layer 16c between the pinned magnetic layer 16a and free magnetic layer 16b, as illustrated in FIGS. 6A through 7D. Members such as a protective layer covering the free magnetic layer 16b and so forth are omitted from illustration in FIGS. 6A through 7D.

The pinned magnetic layer 16a is formed of a soft magnetic material such as a Co—Fe alloy (cobalt-iron alloy), and the free magnetic layer 16b is formed of a soft magnetic material such as an Ni—Fe alloy (nickel-iron alloy). The non-magnetic electroconductive layer 16c is formed of Cu (copper) or the like.

Though omitted from illustration, an antiferromagnetic layer formed of an antiferromagnetic material such as an Ir—Mn alloy (Iridium-Manganese alloy) is joined to the lower side of the pinned magnetic layer 16a in the device portion 16 illustrated in FIG. 6, so that the direction of magnetism of the pinned magnetic layer 16a is pinned by antiferromagnetic coupling between the antiferromagnetic layer and the pinned magnetic layer 16a.

Figure 6A:
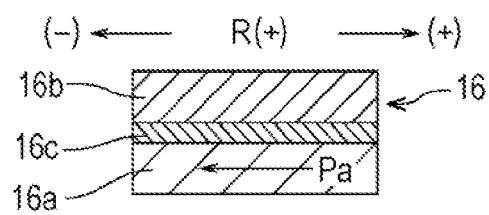
FIGS. 6A through 6D are explanatory diagrams illustrating the device structure of a magnetoresistive device.

The device portion 16 illustrated in FIG. 6A is a first magnetoresistive device R(+), and the pinning direction Pa of magnetization of the pinned magnetic layer 16a faces the second direction (−). The device portion 16 illustrated in FIG. 6B is a second magnetoresistive device R(−), and the pinning direction Pb of magnetization of the pinned magnetic layer 16a faces the first direction (+).

Figure 6B:
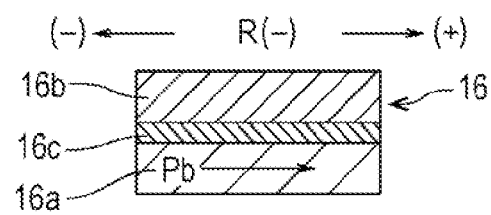
Figure 6C:
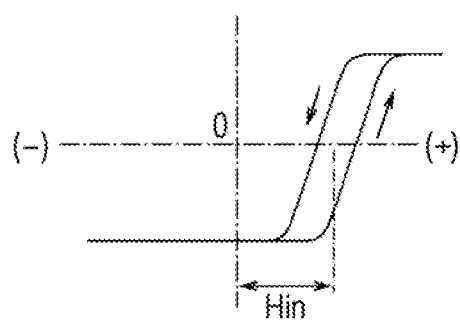

In the first magnetoresistive device R(+) illustrated in FIG. 6A, upon an eternal magnetic field acting upon the device portion 16 facing the first direction (+) across the midpoint O and the intensity of the eternal magnetic field in the first direction (+) exceeding Hin, as illustrated in FIG. 6C, the magnetization of the free magnetic layer 16b preferably faces the first direction (+), and electric resistance of the device portion 16 increases.

Figure 6D:
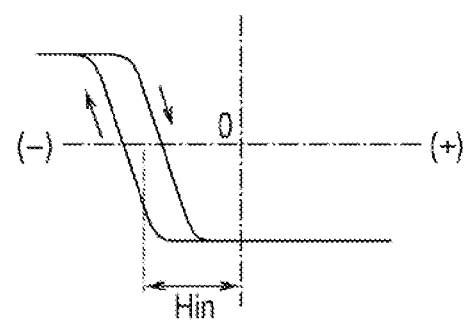

In the second magnetoresistive device R(−) illustrated in FIG. 6B, upon an eternal magnetic field acting upon the device portion 16 facing the second direction (−) across the midpoint O and the intensity of the eternal magnetic field in the second direction (−) exceeding Hin, as illustrated in FIG. 6D, the magnetization of the free magnetic layer 16b preferably faces the second direction (−), and electric resistance of the device portion 16 increases.

The device portion 16 illustrated in FIGS. 7A through 7D is a giant magnetoresistive device employing what is called a self-pinning structure.

Figure 7A:
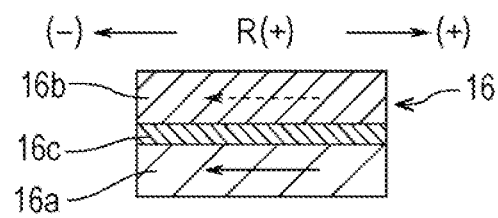
FIGS. 7A through 7D are explanatory diagrams illustrating of another example of the device structure of a magnetoresistive device.

The device portion 16 illustrated in FIG. 7A is a first magnetoresistive device R(+). In a stable state, the magnetization of the pinned magnetic layer 16a and the magnetization of the free magnetic layer 16b both preferably face the second direction (−). Upon an external magnetic field acting upon the device portion 16 facing the first direction (+) across the midpoint O and the intensity of the eternal magnetic field in the first direction (+) exceeding Hin, as illustrated in FIG. 7C, the magnetization of the free magnetic layer 16b preferably faces the first direction (+), and electric resistance of the device portion 16 increases.

Figure 7B:
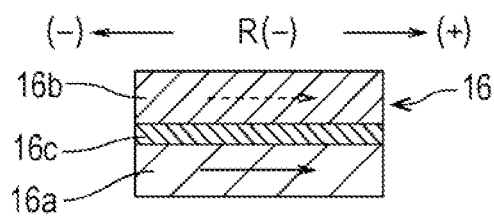
Figure 7C:
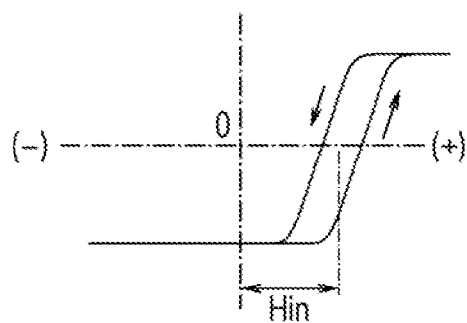
Figure 7D:
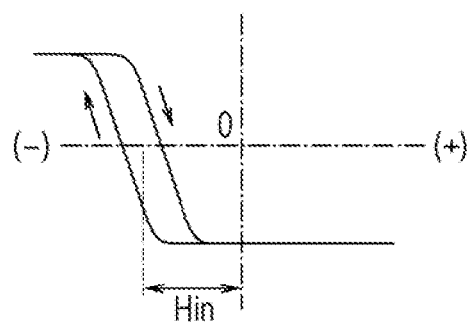

The device portion 16 illustrated in FIG. 7B is a second magnetoresistive device R(−). In a stable state, the magnetization of the pinned magnetic layer 16a and the magnetization of the free magnetic layer 16b both preferably face the first direction (+). Upon an external magnetic field acting upon the device portion 16 facing the second direction (−) across the midpoint O and the intensity of the eternal magnetic field in the second direction (−) exceeding Hin, as illustrated in FIG. 7D, the magnetization of the free magnetic layer 16b preferably faces the second direction (−), and electric resistance of the device portion 16 increases.

The magnetization of the pinned magnetic layer 16a and free magnetic layer 16b may be maintained stable in a parallel state by controlling the thickness of the non-magnetic electroconductive layer 16c, for example.

Figure 8A:
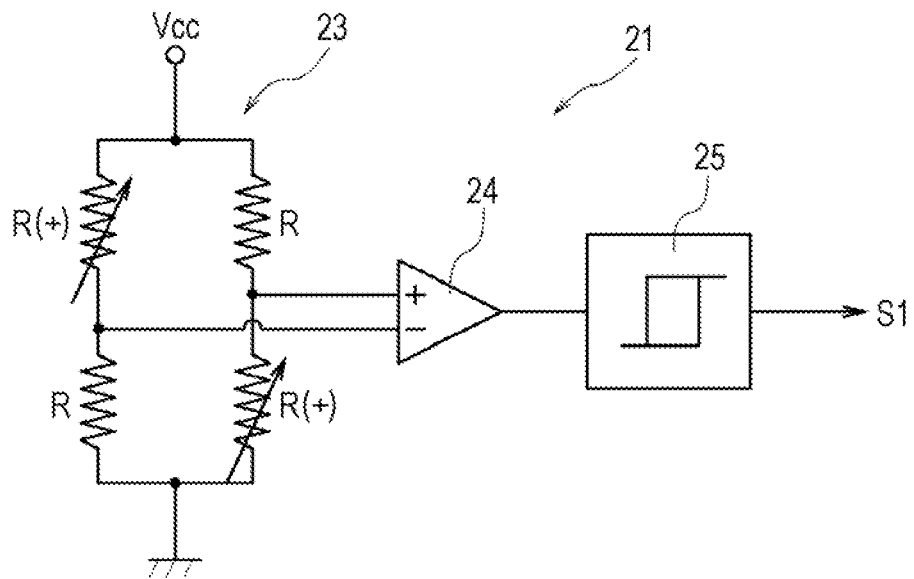
FIGS. 8A and 8B are circuit diagrams of a switch circuit making up a first detection unit and a second detection unit.
Figure 8B:
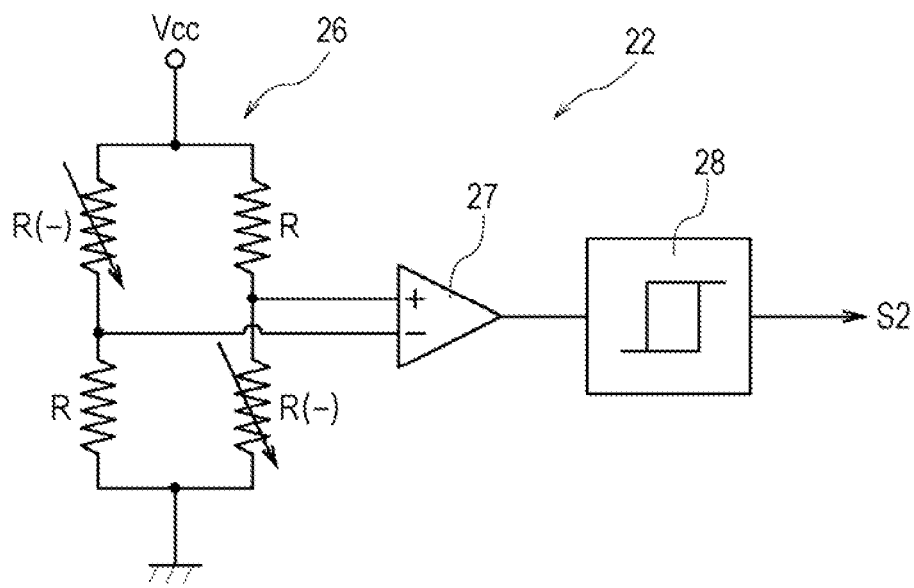

A first switch circuit 21 is illustrated in FIG. 8A, and a second switch circuit 22 in FIG. 8B. These switch circuits 21 and 22 are configured including the first magnetoresistive devices R(+), second magnetoresistive devices R(−), and fixed resistor devices R, formed upon the upper face 11a of the IC package 11 by thin-film formation process, and electronic devices accommodated in the IC package 11, as illustrated in FIG. 4.

The first switch circuit 21 includes a first detection portion 23. The first detection portion 23 is configured including a pair of first magnetoresistive devices R(+) and a pair of fixed resistor devices R forming a bridge circuit. Two midpoint potentials between the first magnetoresistive devices R(+) and fixed resistor devices R are supplied to a differential amplifier 24, and differential output is obtained. This differential output is applied to a Schmitt trigger circuit 25.

The second switch circuit 22 includes a second detection portion 26. The second detection portion 26 is configured including a pair of second magnetoresistive devices R(−) and a pair of fixed resistor devices R forming a bridge circuit. Two midpoint potentials between the second magnetoresistive devices R(−) and fixed resistor devices R are supplied to a differential amplifier 27, and differential output is obtained. This differential output is applied to a Schmitt trigger circuit 28.

Upon the moving unit 5 and operating unit 6 moving to the second detection position (l) as illustrated in FIGS. 2 and 3, an external magnetic field of an intensity exceeding Hin is applied to the first detection portion 23 in the first direction (+), and the resistance value of the first magnetoresistive devices R(+) increases as illustrated in FIGS. 6C and 7C. As a result, first output S1 of the first switch circuit 21 is switched from L to H, that is to say from non-detection output to detection output, as illustrated in FIG. 9A. On the other hand, second output S2 of the second switch circuit 22 remains at L.

Upon the moving unit 5 and operating unit 6 moving to the first detection position (r) as illustrated in FIGS. 2 and 3, an external magnetic field of an intensity exceeding Hin is applied to the second detection portion 26 in the second direction (−), and the resistance value of the second magnetoresistive device R(−) increases as illustrated in FIGS. 6D and 7D. As a result, second output S2 of the second switch circuit 22 is switched from L to H, that is to say from non-detection output to detection output, as illustrated in FIG. 9B. On the other hand, first output S1 of the first switch circuit 21 remains at L.

Upon the moving unit 5 and operating unit 6 moving to the intermediate detection position (n) as illustrated in FIGS. 2 and 3, both the magnetic field component H1 facing the first direction (+) and the magnetic field component H2 facing the second direction (−) hardly act on the first magnetoresistive devices R(+) and second magnetoresistive devices R(−) at all, so the first output S1 of the first switch circuit 21 and the output S2 of the second switch circuit 22 both are at L, that is to say non-detection.

The circuits illustrated in FIGS. 8A and 8B include a differential amplifier 24 and Schmitt trigger circuit 25 in the first switch circuit 21, and a differential amplifier 27 and Schmitt trigger circuit 28 in the second switch circuit 22. Note however, that an arrangement may be made where one differential amplifier and one Schmitt trigger circuit are provided to a switch circuit, the outputs of the first detection portion 23 and the second detection portion 26 are alternately switched, and supplied to a common differential amplifier and Schmitt trigger circuit.

The magnetism detection switch 1 illustrated in FIG. 1 operates such that, as illustrated in FIG. 10, when the operating unit 6 is at the first detection position (r), the first output S1 is L and the second output is H. Also, when the operating unit 6 is at the second detection position (l), the first output S1 is H and the second output S2 is L, and when at the intermediate detection position (n), the first output S1 and second output S2 are both L.

Thus, detection of three positions may be enabled with a minimum number of devices and a minimum number of magnetic field generating units.

Figure 11:
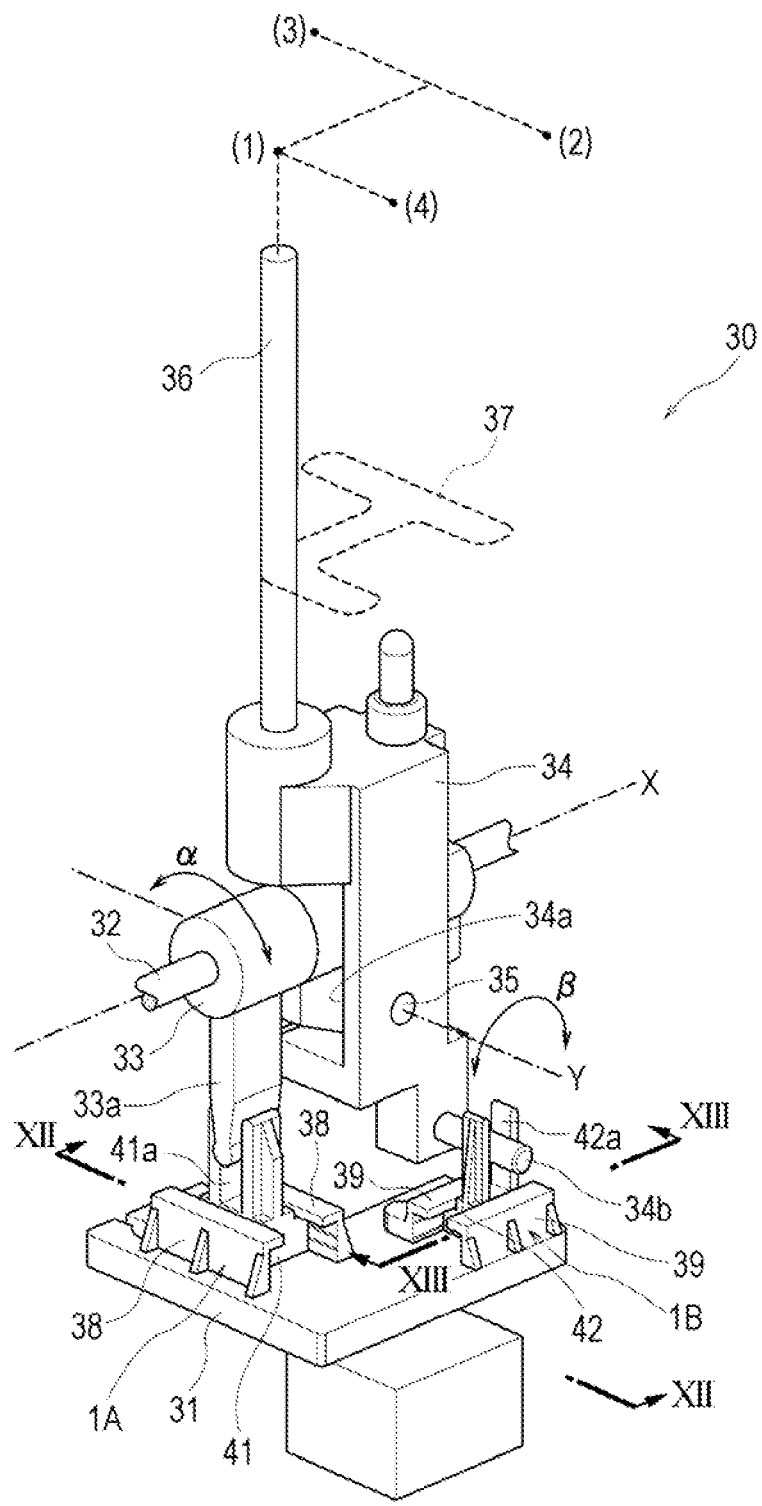
FIG. 11 is a perspective view illustrating a shift lever device according to the first embodiment of the present invention.

FIG. 11 illustrates a shift lever device 30 for an automobile transmission, which is preferably configured as follows. The shift lever device 30 includes a non-magnetic base 31 which formed of a non-magnetic metal material or a synthetic resin material.

A first supporting shaft 32 is provided above the base 31. The first supporting shaft 32 is fixed to a case (omitted from illustration) covering above the base 31. The axis of the first supporting shaft 32 extends in the X direction, and a first rocking member 33 is supported by the second rocking member 34 so as to be capable of rocking in the direction indicated by α. A supporting space 34a is formed within a second rocking member 34, and the first rocking member 33 is situated within the first rocking member 33. A second supporting shaft 35 is fixed to the supporting space 34a. The axis of the second supporting shaft 35 extends in the Y direction which is orthogonal to the X direction, and the second rocking member 34 is supported so as to be capable of rocking on the second supporting shaft 35 in the direction indicated by β.

An operating lever 36 is attached to the second rocking member 34 so as to extend upwards. The operating lever 36 can be tilted in the α direction and the β direction. Note however, that the operating lever 36 passes through a guide path 37 formed in a guide plate situated on or above the case. Thus, the operating lever 36 can be tilted in the α direction and the β direction within a range of moving through the guide path 37. Switching positions to which the operating lever 36 is tilted are the four positions (1), (2), (3), and (4), illustrated in FIG. 11.

FIG. 11 also illustrates first guide portions 38 and second guide portions 39 protruding upwards integrally from the upper face of the base 31.

Figure 12:
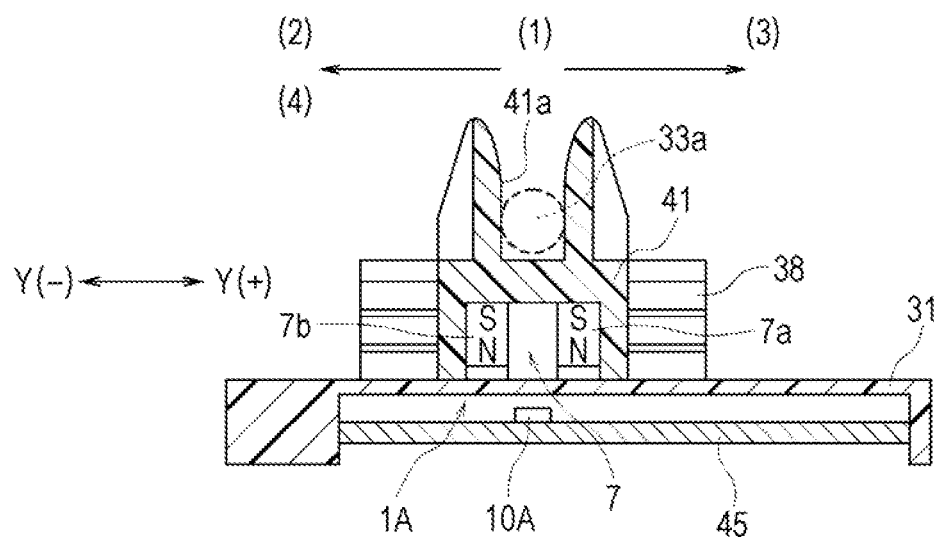
FIG. 12 is a cross-sectional view taken along line XII-XII in FIG. 11.

A first moving portion 41 is slidably guided in the Y direction by the first guide portions 38, as illustrated in FIGS. 11 and 12. A sliding groove 41a is formed above the first moving portion 41. A driving arm 33a is integrally formed to the first rocking member 33 and faces downwards, and the lower end of the driving arm 33a is inserted into the sliding groove 41a so as to be able to slide at the smallest gap thereof.

Figure 13:
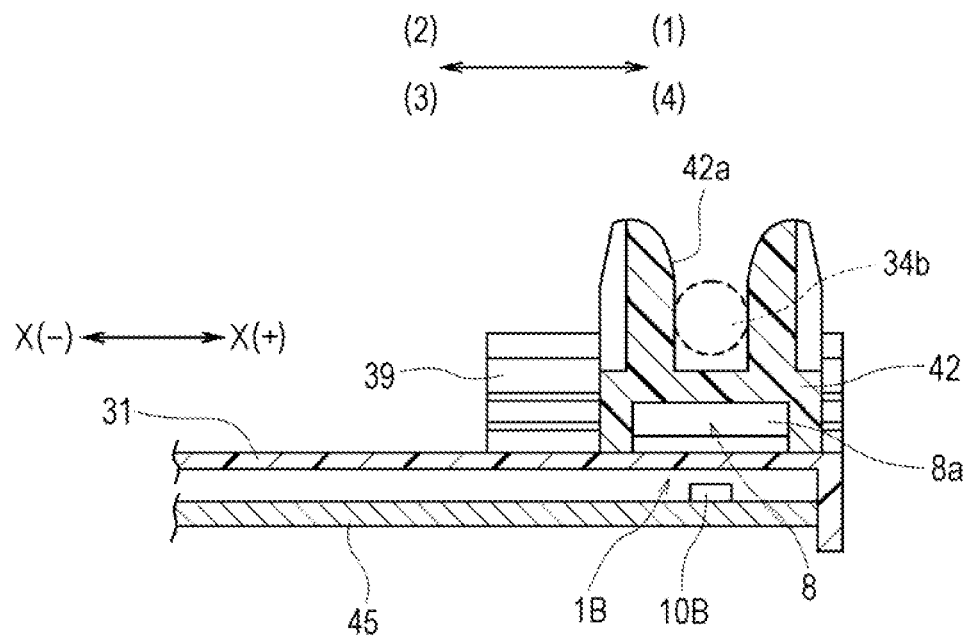
FIG. 13 is a cross-sectional view taken along line XIII-XIII in FIG. 11.

A second moving portion 42 is slidably guided in the X direction by the second guide portions 39, as illustrated in FIGS. 11 and 13. A sliding groove 42a is formed above the second moving portion 42. A driving pin 34b is integrally formed on the lower part of the second rocking member 34 extending in the Y direction, and the driving pin 34b is inserted into the sliding groove 42a so as to be able to slide at the smallest gap thereof.

When the first rocking member 33 is tilted in the α direction, the first moving portion 41 moves in the Y direction, and when the second rocking member 34 moves in the β direction, the second moving portion 42 moves in the X direction.

The first moving portion 41 is a non-magnetic moving part formed of a synthetic resin material or a non-magnetic metal material, and magnets 7a and 7b configuring the magnetic field generating portion 7 the same as that in the embodiment illustrated in FIG. 2 are held in the first moving portion 41, as illustrated in FIG. 12. A base plate 45 formed of a non-magnetic material to serve as a fixed portion is fixed within the base 31 formed of a non-magnetic material, and a minute first detection unit 10A which is a first magnetism detection unit is mounted to the base plate 45.

The first detection unit 10A is the same as the detection unit 10 illustrated in FIG. 2. In the shift lever device 30, a first magnetism detection switch 1A is configured between the first moving portion 41 and the base plate 45 which is a fixed portion. The first magnetism detection switch 1A performs the same detecting operations as the magnetism detection switch 1 illustrated in FIG. 2.

The first magnetism detection switch 1A can detect that the first moving portion 41 has moved to three detection positions, as illustrated in FIG. 10. The first magnetism detection switch 1A can switch detection output between an intermediate detection position where the middle part of the magnetic field generating portion 7 is situated directly above the first detection unit 10A, a first detection position where the first moving portion 41 has moved in the Y(+) direction, and a second detection position where the first moving portion 41 has moved in the Y(−) direction.

The second moving portion 42 is also formed of a synthetic resin material or a non-magnetic metal material, and a magnet 8a configuring the magnetic field generating unit 8 the same as that in the embodiment illustrated in FIG. 3 is held in the second moving portion 42, as illustrated in FIG. 13. A minute second detection unit 10B which is a second magnetism detection unit is mounted to the base plate 45, so as to face the lower side of the second moving portion 42. In the shift lever device 30, a second magnetism detection switch 1B is configured between the second moving portion 42 and the base plate 45 which is the fixed portion.

The second magnetism detection switch 1B can switch detection output between two detection positions, which are an intermediate detection position where the middle part of the magnet 8a is situated directly above the second detection unit 10B as illustrated in FIG. 13, and a second detection position where the second moving portion 42 has moved to the X(−) side from the position in FIG. 13.

The detection unit 10 of the structure illustrated in FIG. 3 may be used as the second detection unit 10B, with only two detection positions of the three detection positions being used. Alternatively, a configuration including only one of the first switch circuit 21 illustrated in FIG. 8A and the second switch circuit 22 illustrated in FIG. 8B may be used as the second detection unit 10B.

Next, operations of the shift lever device 30 will be described. FIG. 14 illustrates outputs S1 and S2 of the first magnetism detection switch 1A provided in the moving region of the first moving portion 41. The change in this output is the same as with the outputs S1 and S2 of the magnetism detection switch 1 illustrated in FIG. 10. When the first moving portion 41 is at the intermediate detection position illustrated in FIG. 12, both the output S1 and output S2 are L. Upon the first moving portion 41 moving in the Y(+) direction and reaching the first detection position, the output S1 remains at L but the output S2 is switched to H. Upon the first moving portion 41 moving in the Y(−) direction from the intermediate detection position and reaching the second detection position, the output S2 remains at L but the output S1 is switched to H.

The second magnetism detection switch 1B illustrated in FIG. 13 obtains detection output of two positions. FIG. 14 illustrates an output S3 as OFF when the magnetic field generating unit 8 is situated directly above the second detection unit 10B, and output S3 as ON when the second moving portion 42 has moved in the X(−) direction.

FIG. 14 illustrates the relationship between switching positions (1), (2), (3), and (4) of the operating lever 36, and the output of the magnetism detection switches 1A and 1B.

When the switching position of the operating lever 36 is (1), the output S1 and output S2 of the first magnetism detection switch 1A are both L, and the output S3 of the second magnetism detection switch 1B is OFF.

When the switching position is (2), this means that the first moving portion 41 has moved in the Y(−) direction and reached the second detection position, so the output S1 of the first magnetism detection switch 1A is switched to H, while the output S2 remains at L. Also, the second moving portion 42 moves in the X(−) direction, so the output S3 of the second magnetism detection switch 1B changes to ON.

When the switching position is (3), this means that the first moving portion 41 has moved in the Y(+) direction and reached the first detection position, so the output S1 of the first magnetism detection switch 1A remains at L, while the output S2 is switched to H. The output S3 of the second magnetism detection switch 1B is ON.

When the switching position is (4), this means that the first moving portion 41 has moved in the Y(−) direction and reached the second detection position, so the output S1 of the first magnetism detection switch 1A is switched to H, while the output S2 remains at L. Also, the second moving portion 42 is at the position illustrated in FIG. 13 so the output S3 of the second magnetism detection switch 1B is OFF.

While only one first detection unit 10A is illustrated in the first magnetism detection switch 1A in FIG. 12, the shift lever device 30 normally includes multiple first detection units 10A to improve safety. This is the same with the second magnetism detection switch 1B illustrated in FIG. 13.

The shift lever device 30 illustrated in FIG. 11 obtains output based on three detection positions by the first magnetism detection switch 1A illustrated in FIG. 12, and obtains output based on two detection positions by the second magnetism detection switch 1B illustrated in FIG. 13. Accordingly, a total of six switching positions can be detected from 3×2=6, and four switching points (1), (2), (3), and (4) thereof are used. Thus, highly-reliable distinguishing detection may be enabled with a minimum number of detection units and a minimum number of magnetic field generating units.

Further, a magnetism detection switch such as illustrated in FIGS. 2 and 3 may be used between the second moving portion 42 and base plate 45, thereby obtaining output of three detection positions of the second moving portion 42. In this case, a maximum of nine switching positions can be distinguished, by 3×3=9.

Figure 15:
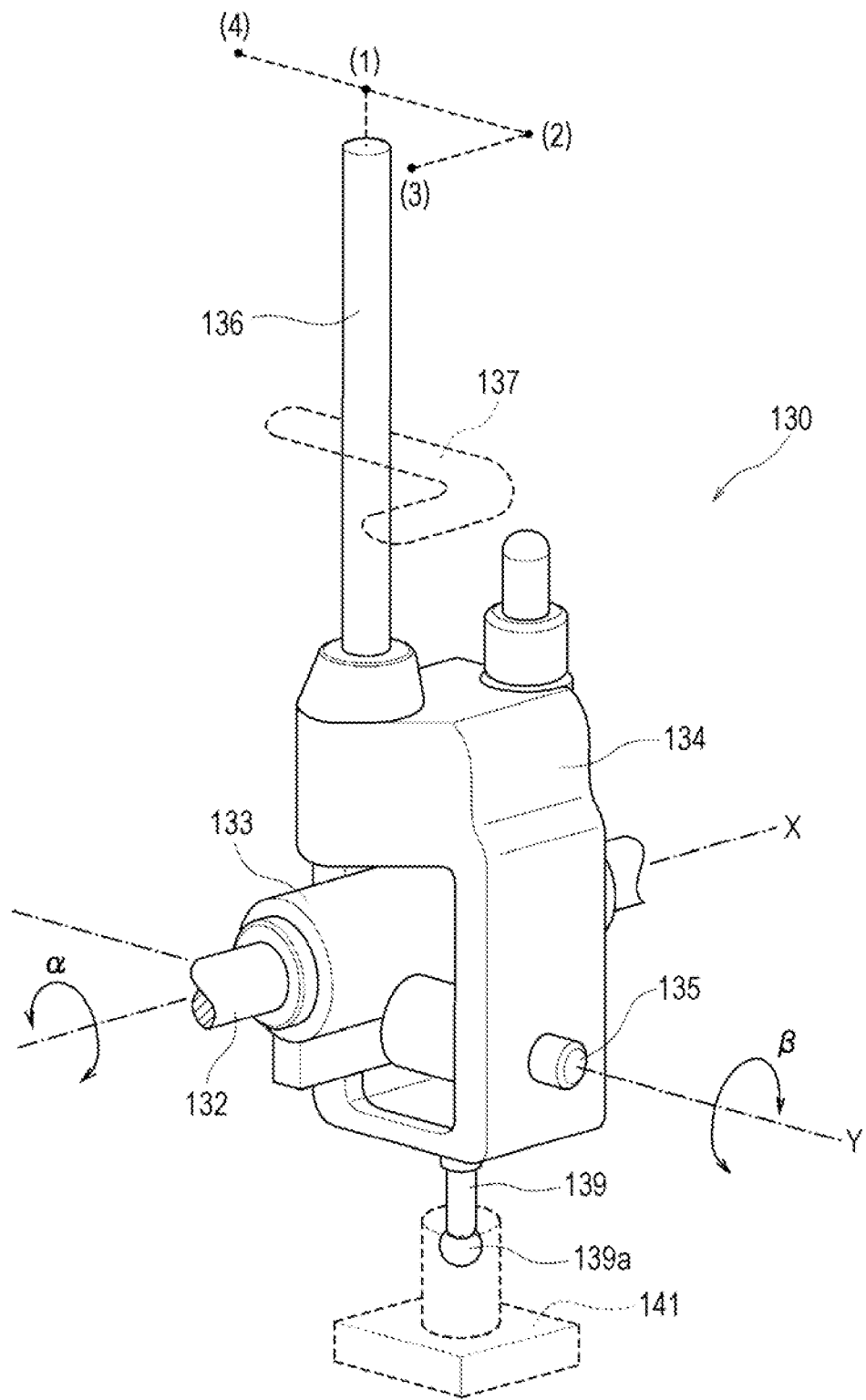
FIG. 15 is a perspective diagram illustrating a shift lever device according to the second embodiment of the present invention.

A shift lever device 130 according to the second embodiment, illustrated in FIG. 15, is configured with a first rocking member 133 rockably supported by a first supporting shaft 132, and a second rocking member 134 supported by a second supporting shaft 135 provided to the first rocking member 133.

An operating lever 136 is attached to the second rocking member 134 so as to extend upwards. The operating lever 136 moves through an L-shaped guide path 137. Accordingly, the operating lever 136 can be set to three positions of (1), (2), and (4) by being tilted in the α direction on the X axis. The operating lever 136 can also be set to the two positions of (2) and (3) by being tilted in the β direction on the Y axis.

A base (omitted from illustration) is provided below the second rocking member 134, and a moving portion 141 is provided upon this base so as to be capable of planar motion in both the X direction and Y direction. A driving protrusion 139 is provided on the bottom of the second rocking member 134, with a spherical portion 139a at the lower end thereof being turnably linked to the first moving portion 141.

Figure 16:
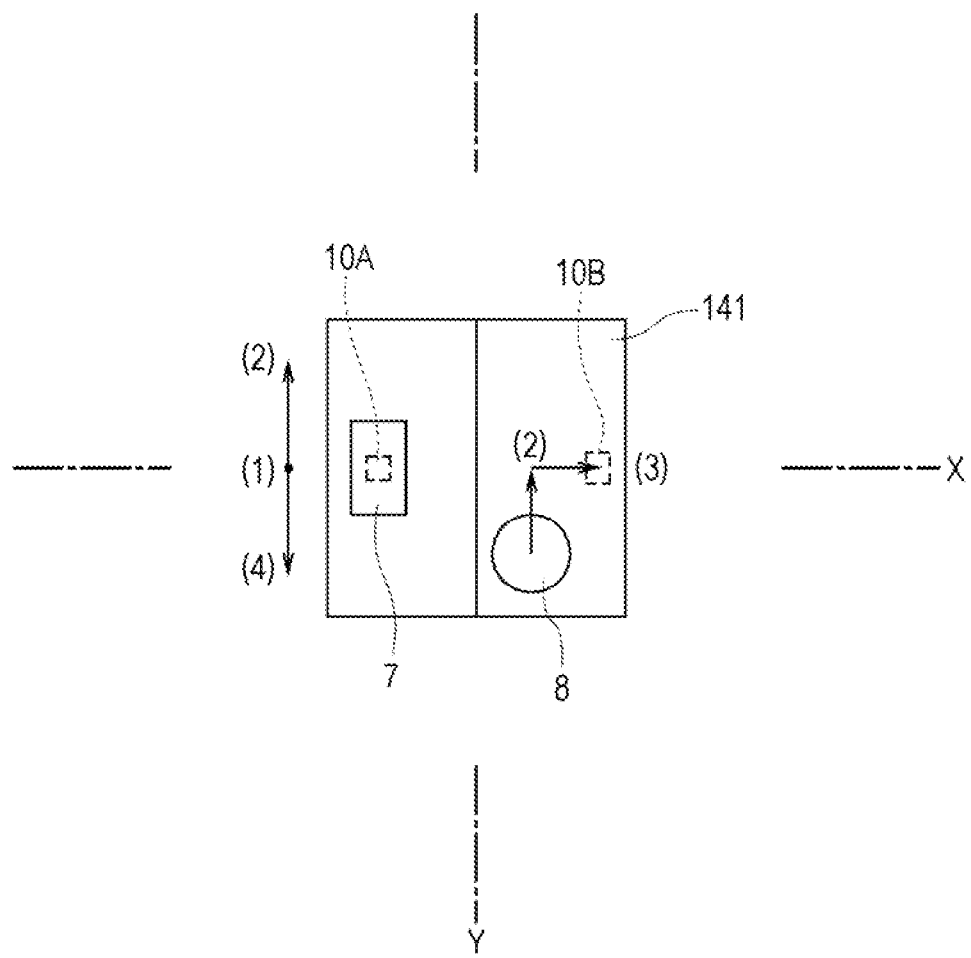
FIG. 16 is an explanatory diagram for describing detecting operations of the shift lever device illustrated in FIG. 15.

FIG. 16 illustrates the moving portion 141 from above. The moving portion 141 includes both the magnetic field generating portion 7 and the magnetic field generating unit 8. The magnetic field generating portion 7 is the same as that illustrated in FIG. 12, and includes the magnets 7a and 7b. The magnetic field generating unit 8 is the same as that illustrated in FIG. 13, and includes the magnet 8a.

A base plate formed of a non-magnetic material is disposed below the moving region of the first moving portion 141, and the detection unit 10A and detection unit 10B are fixed to this base plate.

Upon the operating lever 136 being moved among the three positions of (1), (2), and (4), the magnetic field generating portion 7 moves to the three positions slightly above the detection unit 10A as illustrated in FIG. 16, obtaining detection output according to the respective positions. Upon the operating lever 136 being moved among the two positions of (2) and (3), the magnetic field generating unit 8 moves to the two positions slightly above the second detection unit 10B, obtaining detection output according to the respective positions.

What is claimed is:

1. A shift lever device comprising:
    a shift lever having at least three switching positions and being configured to move by tilting;
    a moving portion configured to reciprocally move in accordance with the tilting of the shift lever;
    a fixed portion facing the moving portion;
    a magnetic field generating unit, provided to one of the fixed portion and the moving portion; and
    a magnetism detection unit, provided to the other of the fixed portion and the moving portion;
    wherein the moving portion is capable of moving to
        an intermediate detection position,
        a first detection position shifted in a first direction from the intermediate detection position, and
        a second detection position shifted in a second direction opposite to the first direction from the intermediate detection position;
    wherein the magnetism detection unit includes:
        a first magnetoresistive device configured to output a first detection signal in response to a magnetic field applied thereto when an intensity of the magnetic field in the first direction exceeds a predetermined value, and
        a second magnetoresistive device configured to output a second detection signal in response to the magnetic field applied thereto when an intensity of the magnetic field in the second direction exceeds a predetermined value;
    and wherein the magnetic field generating unit is configured:
        to provide the second detection unit with a magnetic field having an intensity exceeding the predetermined value in the direction, when the moving portion moves to the first detection position,
        to provide the detection unit with the magnetic field having the intensity exceeding the predetermined value in the first direction, when the moving portion moves to the second detection position, and
        not to provide the detection unit with a magnetic field of intensity exceeding the predetermined value in the first direction or the second direction, when the moving portion moves to the intermediate detection position.

2. The shift lever device according to claim 1, wherein the magnetic field generating unit includes a pair of magnets arrayed in a direction of movement of the moving portion, the pair of magnets having a same magnetic polarity in a direction facing the magnetism detecting unit.

3. The shift lever device according to claim 1, wherein the magnetic field generating unit further includes a magnet having a width in a moving direction of the moving portion greater than a thickness in a direction orthogonal to the moving direction, a face of the magnet facing the magnetism detecting unit being magnetized to a single magnetic pole.

4. The shift lever device according to claim 1,
    wherein a magnetization direction of a free magnetic layer of the first magnetoresistive device is aligned in the first direction when the intensity of a magnetic field in the first direction exceeds the predetermined value;
    and wherein a magnetization direction of a free magnetic layer of the second magnetoresistive device is aligned in the second direction when the intensity of a magnetic field in the second direction exceeds the predetermined value.

5. The shift lever device according to claim 1, wherein the shift lever is further configured to move by tilting in a plurality of directions orthogonal to each other,
    wherein the moving portion includes:
        a first moving portion configured to reciprocally move in accordance with the tilting of the shift lever in one of the plurality of directions; and
        a second moving portion configured to reciprocally move in accordance with the tilting of the shift lever in another of the plurality of directions,
    wherein the fixed portion faces the first moving portion and the second moving portion,
    and wherein the magnetic field generating unit and the magnetism detection unit are provided between at least one of the first moving portion and the second moving portion, and the fixed portion.

6. The shift lever device according to claim 5, wherein the magnetic field generating unit and the magnetism detection unit are provided between the first moving portion and the fixed portion, the shift lever device further comprising a switch configured to detect two positions, the switch being provided between the second moving portion and the fixed portion.

* * * * *